US012750149B2

(12) United States Patent
Chang

(10) Patent No.: US 12,750,149 B2
(45) Date of Patent: Sep. 29, 2026

(54) APPARATUS AND METHOD FOR TWO-WAY DELAY ERROR COMPENSATION IN COMMUNICATION SYSTEM

(71) Applicant: ELECTRONICS AND TELECOMMUNICATIONS RESEARCH INSTITUTE, Daejeon (KR)

(72) Inventor: Sun Hyok Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 227 days.

(21) Appl. No.: 18/592,465

(22) Filed: Feb. 29, 2024

(65) Prior Publication Data

US 2024/0322928 A1 Sep. 26, 2024

(30) Foreign Application Priority Data

Mar. 23, 2023 (KR) ........................ 10-2023-0037972

(51) Int. Cl.
*H04J 3/06* (2006.01)
*H04B 10/25* (2013.01)
*H04Q 11/00* (2006.01)

(52) U.S. Cl.
CPC ............ *H04J 3/0667* (2013.01); *H04B 10/25* (2013.01); *H04Q 11/0062* (2013.01); *H04Q 2011/0075* (2013.01)

(58) Field of Classification Search
CPC .... H04B 10/25; H04Q 11/0062; H04J 3/0667
USPC .......................................................... 398/204
See application file for complete search history.

(56) References Cited

U.S. PATENT DOCUMENTS 8,565,620 B2 10/2013 Chung et al.
8,594,134 B2 * 11/2013 Zampetti ............ H04B 10/2589 370/503
8,600,239 B2 * 12/2013 Mani .................. H04J 14/0272 398/154
9,264,132 B2 * 2/2016 Zampetti ............... H04J 3/0644
2012/0320794 A1 12/2012 Belhadj et al.
2021/0152251 A1 5/2021 Moon et al.
(Continued)

FOREIGN PATENT DOCUMENTS

CN 105356944 A * 2/2016 ......... H04B 10/2525
CN 112202523 A * 1/2021 ............ H04J 3/0638
KR 1020130066442 A 6/2013
(Continued)

*Primary Examiner* — Amritbir K Sandhu
(74) *Attorney, Agent, or Firm* — Rabin & Berdo, P.C.

(57) ABSTRACT

Proposed is an operation method for two-way delay error compensation, the method including first to sixth steps. In the first step, a first wavelength is set as a signal wavelength for a master and a third wavelength is set as a signal wavelength for a slave. In the second step, first, second, third, and fourth time points are identified by using PTP. In the third step, a second wavelength is set as a signal wavelength for the master and the second wavelength is set for the slave. In the fourth step, fifth, sixth, seventh, and eighth time points are identified by using the PTP. In the fifth step, a delta value for a two-way delay error is identified on the basis of the first to eighth time points. In the sixth step, a compensation value of the two-way delay error is identified on the basis of the delta value.

17 Claims, 5 Drawing Sheets

(56) References Cited

U.S. PATENT DOCUMENTS

2024/0322928 A1* 9/2024 Chang ................ H04Q 11/0062

FOREIGN PATENT DOCUMENTS

| | | | | |
|---|---|---|---|---|
| KR | 1020150016735 A | 2/2015 | | |
| KR | 10-1742627 B1 | 6/2017 | | |
| KR | 10-2407341 B1 | 6/2022 | | |
| WO | WO-2016092242 A1 * | 6/2016 | ............ | H04J 3/0667 |

* cited by examiner

| Output port \ Input port | 1 | 2 | 3 | 4 |
|---|---|---|---|---|
| 1 | λ1 | λ2 | λ3 | λ4 |
| 2 | λ2 | λ3 | λ4 | λ1 |
| 3 | λ3 | λ4 | λ1 | λ2 |
| 4 | λ4 | λ1 | λ2 | λ3 |

| Output port \ Input port | 1 | 2 | 3 | 4 | ··· | N |
|---|---|---|---|---|---|---|
| 1 | λ1 | λ2 | λ3 | λ4 | ··· | λN |
| 2 | λ2 | λ3 | λ4 | λ5 | ··· | λ1 |
| 3 | λ3 | λ4 | λ5 | λ6 | ··· | λ2 |
| 4 | λ4 | λ5 | λ6 | λ7 | ··· | λ3 |
| ⋮ | ⋮ | ⋮ | ⋮ | ⋮ | | ⋮ |
| N | λN | λ1 | λ2 | λ3 | ··· | λ(N-1) |

701
702
703

APPARATUS AND METHOD FOR TWO-WAY DELAY ERROR COMPENSATION IN COMMUNICATION SYSTEM

CROSS REFERENCE TO RELATED APPLICATION

The present application claims priority to Korean Patent Application No. 10-2023-0037972, filed 23 Mar. 2023, the entire contents of which is incorporated herein for all purposes by this reference.

BACKGROUND OF THE INVENTION

Field of the Invention

The present disclosure relates generally to a communication system. More particularly, the present disclosure relates to an apparatus and a method for two-way delay error compensation in a communication system.

Description of the Related Art

As mobile networks evolve to 4G and 5G, traffic transfer rates are increasing and various multiplexing technologies and multiple-input and multiple-output (MIMO) technologies are being widely used. Therefore, synchronization between remote units (RUs), distributed units (DUs), and central units (CUs) constituting the fronthaul of a mobile network, and devices constituting the backhaul, and nodes is critical.

One way to realize synchronization is to use global navigation satellite system (GNSS) signals, but this has problems such as relatively expensive installation costs and indoor installations where GNSS signals cannot be received.

The Precision Time Protocol (PTP) is an IEEE 1588 v2 clock synchronization standard that enables accurate synchronization between devices in a network, and is a very precise protocol for synchronizing the clocks of each node in a distributed network. Using this, an accurate time point is transmitted over the network for synchronization.

The foregoing is intended merely to aid in the understanding of the background of the present disclosure, and is not intended to mean that the present disclosure falls within the purview of the related art that is already known to those skilled in the art.

SUMMARY OF THE INVENTION

The present disclosure is directed to providing an apparatus and a method for two-way delay error compensation in a communication system.

In addition, the present disclosure is directed to providing an apparatus and a method for compensating for a two-way delay error that occurs in physical connection between a master and a slave in a communication system.

In addition, the present disclosure is directed to providing an apparatus and a method for compensating for a two-way delay error in a communication system to improve the accuracy of T_offset obtained by the PTP, and for correcting the time of a master and a slave to realize precise synchronization.

In addition, the present disclosure is directed to providing an apparatus and a method for providing a method and an apparatus that are applicable in a situation where a PTP master and a PTP slave are connected to each other via an optical fiber ranging from several meters to several tens of kilometers in a communication system.

According to various embodiments of the present disclosure, there is provided an operation method for two-way delay error compensation in a communication system, the operation method including: setting a first wavelength (λ1) as a signal wavelength for a master and a third wavelength (λ3) as a signal wavelength for a slave in a first step; identifying a first time point, a second time point, a third time point, and a fourth time point by using Precision Time Protocol (PTP) in a second step; setting a second wavelength (λ2) as a signal wavelength for the master and the second wavelength (λ2) for the slave in a third step; identifying a fifth time point, a sixth time point, a seventh time point, and an eighth time point by using the PTP in a fourth step; identifying a delta value for a two-way delay error on the basis of the first time point to the eighth time point in a fifth step; and identifying a compensation value of the two-way delay error on the basis of the delta value for the two-way delay error in a sixth step.

According to various embodiments of the present disclosure, there is provided an apparatus for two-way delay error compensation in a communication system, the apparatus including: a transceiver; and a controller operably connected to the transceiver, wherein the controller is configured to set a first wavelength (λ1) as a signal wavelength for a master and a third wavelength (λ3) as a signal wavelength for a slave, identify a first time point, a second time point, a third time point, and a fourth time point by using Precision Time Protocol (PTP), set a second wavelength (λ2) as a signal wavelength for the master and the second wavelength (λ2) for the slave, identify a fifth time point, a sixth time point, a seventh time point, and an eighth time point by using the PTP, identify a delta value for a two-way delay error on the basis of the first time point to the eighth time point, and identify a compensation value of the two-way delay error on the basis of the delta value for the two-way delay error.

According to various embodiments of the present disclosure, there is provided an operation method of a master in a communication system, the operation method including: setting a first wavelength (λ1) as a signal wavelength for the master; identifying a first time point and a third time point by using Precision Time Protocol (PTP); setting a second wavelength (λ2) as a signal wavelength for the master; and identifying a fifth time point and a seventh time point by using the Precision Time Protocol (PTP), wherein the first time point, the third time point, the fifth time point, and the seventh time point are the basis for obtaining a delta value for a two-way delay error, and the delta value for the two-way delay error is the basis for identifying a compensation value of the two-way delay error.

According to various embodiments of the present disclosure, there is provided an operation method of a slave in a communication system, the operation method including: setting a third wavelength (λ3) as a signal wavelength for the slave; identifying a second time point and a fourth time point by using Precision Time Protocol (PTP); setting the second wavelength (λ2) as a signal wavelength for the slave; and identifying a sixth time point and an eighth time point by using the Precision Time Protocol (PTP), wherein the second time point, the fourth time point, the sixth time point, and the eighth time point are the basis for obtaining a delta value for a two-way delay error, and the delta value for the two-way delay error is the basis for identifying a compensation value of the two-way delay error.

The apparatus and the method according to various embodiments of the present disclosure compensate for a two-way delay error to improve the accuracy of T_offset obtained by the Precision Time Protocol (PTP) and correct the time of a master and a slave to realize precise synchronization.

In addition, the apparatus and the method according to various embodiments of the present disclosure are an apparatus and a method for compensating for a two-way delay error, and do not require separate hardware or software, thereby reducing installation costs or operating costs.

In addition, the apparatus and the method according to various embodiments of the present disclosure are applicable in a situation where a PTP master and a PTP slave are connected to each other via an optical fiber ranging from several meters to several tens of kilometers, so that synchronization can be realized regardless of a network environment.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
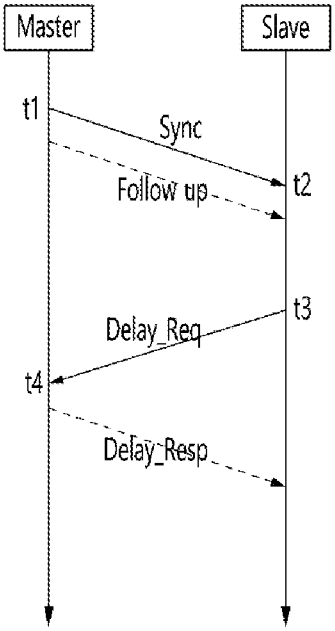
FIG. 1 illustrates an operation method for the Precision Time Protocol, according to various embodiments of the present disclosure.

The terms used in the present disclosure are merely used to describe a particular embodiment, and are not intended to limit the scope of another embodiment. An expression used in the singular encompasses the expression of the plural, unless it has a clearly different meaning in the context. All the terms including technical and scientific terms used herein have the same meaning as commonly understood by those skilled in the art to which the present disclosure belongs. Among the terms used in the present disclosure, the terms defined in a general dictionary may be interpreted to have the meanings the same as or similar to the contextual meanings in the relevant art, and are not to be interpreted to have ideal or excessively formal meanings unless explicitly defined in the present disclosure. In some cases, even the terms defined in the present disclosure should not be interpreted to exclude the embodiments of the present disclosure.

In various embodiments of the present disclosure to be described below, a hardware approach will be described as an example. However, the various embodiments of the present disclosure include a technology using both hardware and software, so the various embodiments of the present disclosure do not exclude a software-based approach.

Hereinafter, the present disclosure relates to an apparatus and a method for two-way delay error compensation in a communication system. Specifically, the present disclosure describes a technology for compensating for a two-way delay error that occurs in physical connection between a master and a slave in a communication system.

As a technical field of the present disclosure, the Precision Time Protocol (PTP) is a clock synchronization standard that enables accurate synchronization between devices in a network, and may be a very precise protocol for synchronizing clocks in a distributed network. Using this, accurate time is transmitted over the network for synchronization.

The present disclosure provides a method and an apparatus for compensating for a two-way delay error that occurs in physical connection between a PTP master and a PTP slave.

The present disclosure is based on an invention carried out with the support of Institute of Information & Communications Technology Planning & Evaluation (No. 2020-0-00847, 5G+Base Station Fronthaul Technology Development) funded by the government (Ministry of Science and ICT) in 2022.

As mobile networks evolve to 4G and 5G, traffic transfer rates increase and various multiplexing technologies and multiple-input and multiple-output (MIMO) technologies are widely used. Therefore, synchronization between remote units (RUs), distributed units (DUs), and central units (CUs) constituting the fronthaul of a mobile network, and devices constituting the backhaul, and nodes is critical. One way to realize synchronization is to use global navigation satellite system (GNSS) signals, but this has problems such as relatively expensive installation costs and indoor installations where GNSS signals cannot be received.

The Precision Time Protocol (PTP) is an IEEE 1588 v2 clock synchronization standard that enables accurate synchronization between devices in a network, and is a very precise protocol for synchronizing the clocks of each node in a distributed network. Using this, an accurate time point is transmitted over the network for synchronization.

FIG. 1 illustrates an operation method for the Precision Time Protocol, according to various embodiments of the present disclosure.

Referring to FIG. 1, a master that ensures precise time transmits a current time point t1 of the master as a timestamp to a slave and the slave records the received t1 and the slave's time point t2 of receipt. Similarly, the slave transmits a time point t3 and the master obtains a time point t4. The time point t4 is transmitted to the slave. Finally, the slave obtains the time points t1, t2, t3, and t4. If the time difference between the master and the slave is called T_offset, the relationship may be summarized as follows according to Equation 1 and Equation 2.

$$t2 - t1 = D\_ms + T\_offset \quad \text{[Equation 1]}$$

$$t4 - t3 = D\_sm - T\_offset \quad \text{[Equation 2]}$$

Herein, D_ms denotes the propagation delay from the master to the slave, and D_sm denotes the propagation delay from the slave to the master.

In the Precision Time Protocol (PTP), D_ms=D_sm is assumed. Using this, T_offset may be represented as shown in Equation 3.

$$T\_offset = \{(t2 - t1) - (t4 - t3)\}/2 \quad \text{[Equation 3]}$$

Using T_offset obtained on the basis of Equation 3, the time of the slave is corrected and synchronization with the master is obtained.

Figure 2:
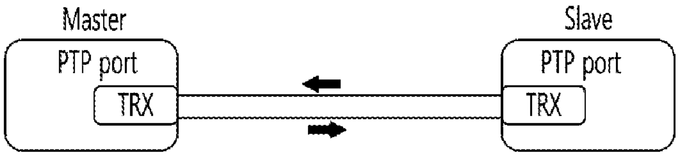
FIG. 2 illustrates physical connection between a master and a slave, according to various embodiments of the present disclosure.

FIG. 2 illustrates physical connection between a master and a slave, according to various embodiments of the present disclosure.

Referring to FIG. 2, in a communication network, a PTP master and a PTP slave may be connected to each other via an optical fiber ranging from several meters to several tens of kilometers. In addition, a PTP port of the master and a PTP port of the slave may be connected to each other using optical transceivers (TRXs). In this situation, the values of D_ms and D_sm cannot be the same, and may have a difference of several μseconds or more depending on the situation. This two-way delay difference affects the accuracy of T_offset obtained by the PTP. Therefore, there is a need of a method of compensating for a two-way delay difference.

As the related art, US patent "UNIVERSAL ASYMMETRY COMPENSATION FOR PACKET TIMING PROTOCOLS" (U.S. Pat. No. 9,264,132 B2) provides a method of receiving GNSS signals from a master and a slave respectively, obtaining information on asymmetry, that is, a two-way delay difference, from the GNSS signals, and correcting the delay difference from the information. This method has a problem that the master and the slave each have to be capable of GNSS signal connection.

Korean patent "METHOD FOR TRANSMITTING AND RECEIVING MESSAGES OF PRECISION TIME PROTOCOL (PTP) AND APPARATUS THEREFOR" (Korean Patent No. 10-24078341) enables more precise time synchronization by recording up-to-date time information in PTP messages. However, Korean Patent No. 10-24078341 does not address the issue of the method of compensating for a two-way delay difference, which is provided in the present disclosure.

The present disclosure is directed to providing a method and an apparatus for two-way delay error compensation between a PTP master and a PTP slave. Through this, more precise time synchronization of the slave is achieved.

The terms referring to signals, the terms referring to channels, the terms referring to control information, the terms referring to network entities, the terms referring to elements of an apparatus, and the like used in the description below are only examples for the convenience of description. Accordingly, the present disclosure is not limited to the terms described below, and the terms may be replaced by other terms having the same technical meanings.

In addition, various embodiments of the present disclosure are described using terms used in some communication standards (e.g., the 3rd Generation Partnership Project (3GPP)), but the embodiments are only examples for the description. The various embodiments of the present disclosure may be easily modified and applied to other communication systems.

Figure 3:
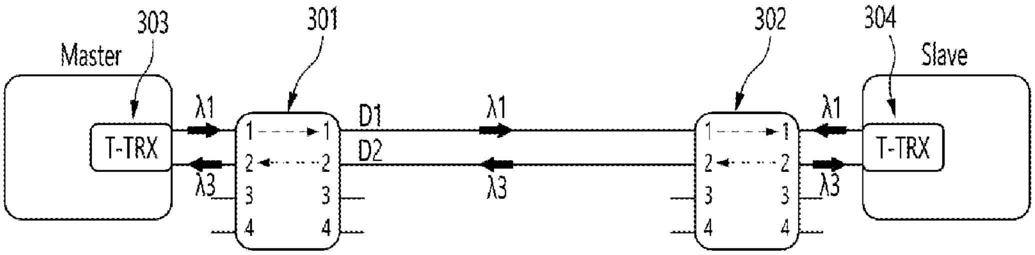
FIG. 3 illustrates a first apparatus for two-way delay error compensation, according to an embodiment of the present disclosure.

FIG. 3 illustrates a first apparatus for two-way delay error compensation, according to an embodiment of the present disclosure.

Referring to FIG. 3, a device 301 and a device 302 each represent a cyclic arrayed waveguide grating (AWG). A signal with time information is output from a PTP port 303 of a master using wavelength channel λ1. This is output from input port 1 to output port 1 in the cyclic AWG 301.

Similarly, the signal is output from input port 1 to output port 1 in the cyclic AWG 302 and received at a PTP port 304 of a slave. Herein, the delay time of the path may be denoted by D1.

In the reverse direction, a signal with time information is output from the PTP port 304 of the slave using wavelength channel λ3. This may be output from input port 2 to output port 2 in the cyclic AWG 302.

Similarly, the signal is output from input port 2 to output port 2 in the cyclic AWG 301 and received at the PTP port 303 of the master. Herein, the delay time of the path may be denoted by D2.

Figures 4, 5:
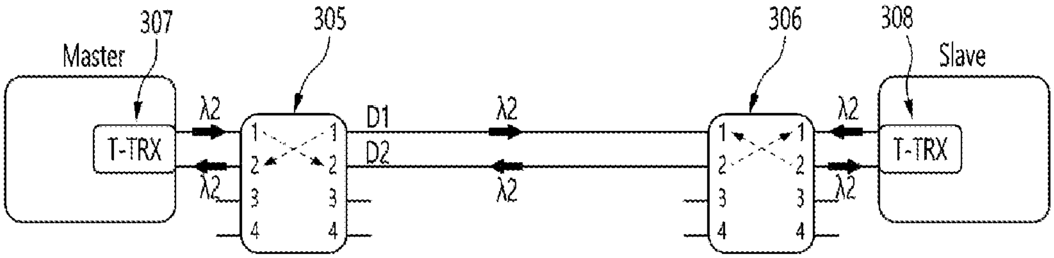
FIG. 4 illustrates a second apparatus for two-way delay error compensation, according to an embodiment of the present disclosure.
FIG. 5 illustrates input and output of wavelength channels depending on input and output ports of FIGS. 3 and 4, according to an embodiment of the present disclosure.

FIG. 4 illustrates a second apparatus for two-way delay error compensation, according to an embodiment of the present disclosure.

Referring to FIG. 4, a device 303 and a device 304 may represent tunable optical transceivers applied to PTP ports. FIG. 4 shows that a wavelength channel output from a T-TRX 307 of a master and a T-TRX 308 of a slave is changed.

A signal with time information is output from the PTP port 307 of the master using wavelength channel λ2. This is output from input port 1 to output port 2 in a cyclic AWG 305. In this case, the signal passes through the lower path as shown in FIG. 4, and the signal is output from input port 2 to output port 1 in a cyclic AWG 306 and received at the PTP port 308 of the slave. Herein, the delay time of the path is denoted by D2.

In the reverse direction, a signal with time information is output from the PTP port 308 of the slave using λ2 wavelength channel. This is output from input port 2 to output port 1 in the cyclic AWG 306. In this case, the signal passes through the upper path as shown in FIG. 4. Similarly, the signal is output from input port 1 to output port 2 in the cyclic AWG 305 and received at the PTP port 307 of the master. Herein, the delay time of the path may be denoted by D1.

FIG. 5 illustrates input and output of wavelength channels depending on input and output ports of FIGS. 3 and 4, according to an embodiment of the present disclosure. FIG. 5 shows a 4×4 cyclic AWG with four input ports and four output ports as an example.

Referring to FIG. 5, wavelength channel λ1 is input to input port 1 and output to output port 1. Wavelength channel λ2 is input to input port 1 and output to output port 2. The 4×4 cyclic AWG operates in this manner. Due to the characteristic of the cyclic AWG, cyclicity appears as shown in FIG. 5. The cyclic AWG shown in FIG. 5 is a passive optical device that does not need power supply and has the characteristic that output ports are determined depending on input wavelength channels.

Figures 6, 7:
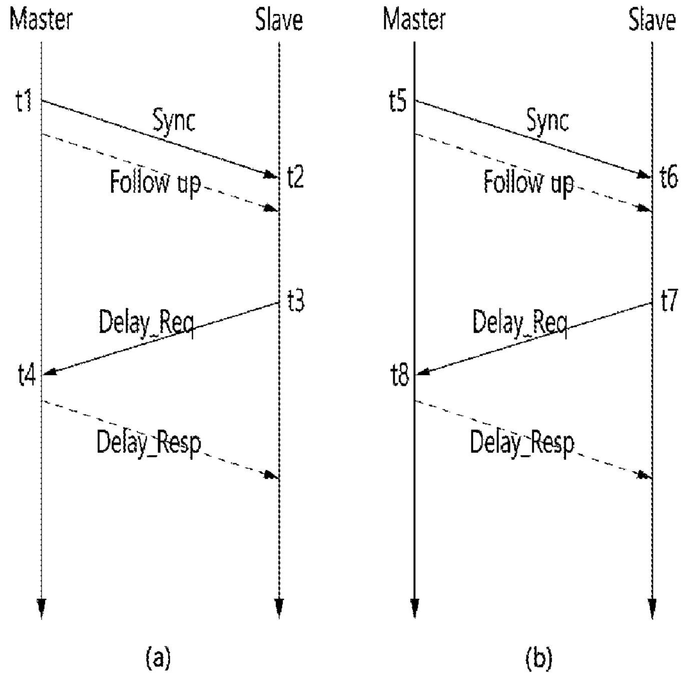
FIG. 6 illustrates an operation method for the Precision Time Protocol, according to an embodiment of the present disclosure.
FIG. 7 illustrates a relationship of wavelength channels for input and output ports, according to an embodiment of the present disclosure.

FIG. 6 illustrates an operation method for the Precision Time Protocol, according to an embodiment of the present disclosure.

First, (a) of FIG. 6 shows an operation method for the Precision Time Protocol in the same state as in FIG. 3.

Referring to (a) of FIG. 6, Equation 4 and Equation 5 may be obtained by the operation of the Precision Time Protocol in the same state as in FIG. 3.

$$t2-t1=D1+\text{T\_offset} \quad \text{[Equation 4]}$$

$$t4-t3=D2-\text{T\_offset} \quad \text{[Equation 5]}$$

First, (b) of FIG. 6 shows an operation method for the Precision Time Protocol in the same state as in FIG. 4.

Referring to (b) of FIG. 6, Equation 6 and Equation 7 may be obtained by the operation of the Precision Time Protocol in the same state as in FIG. 3.

$$t6-t5=D2+\text{T\_offset} \quad \text{[Equation 6]}$$

$$t8-t7=D1-\text{T\_offset} \quad \text{[Equation 7]}$$

With expression D2=D1+Delta, the summary may be obtained as Equation 8.

$$\text{Delta}=\{(t4-t3)+(t6-t5)-(t2-t1)-(t8-t7)\}/2 \quad \text{[Equation 8]}$$

That is, as shown in Equation 8, Delta, which is the two-way delay error, may be obtained.

Afterward, after obtaining Delta in one execution, Delta is used as it is in the PTP process. That is, using Equation 4 and Equation 5, Equation 9 may be obtained as follows.

$$\text{T\_offset}=\{(t2-t1)-(t4-t3)\}/2+\text{Delta}/2 \quad \text{[Equation 9]}$$

When compared to Equation 3, Equation 9 can be seen to be a value obtained by compensating for the two-way delay error. The present disclosure may enable more precise time alignment by reducing the time error with the above-described method.

FIG. 7 illustrates a relationship of wavelength channels for input and output ports, according to an embodiment of the present disclosure.

Referring to FIG. 7, the cyclic AWG proposed in the present disclosure can generally be implemented with N×N, that is, N input ports and N output ports. Herein, the relationship of the wavelength channels for the input and output ports is as shown in the table of FIG. 7.

In the present disclosure, the description is made using the configuration 701, that is, input ports 1 and 2 and output ports 1 and 2, and wavelength channels λ1, λ2, λ3. Similarly, the operation may be conducted using other ports or wavelength channels, such as the configuration 702 or 703, as long as the foregoing description is met.

Figure 8:
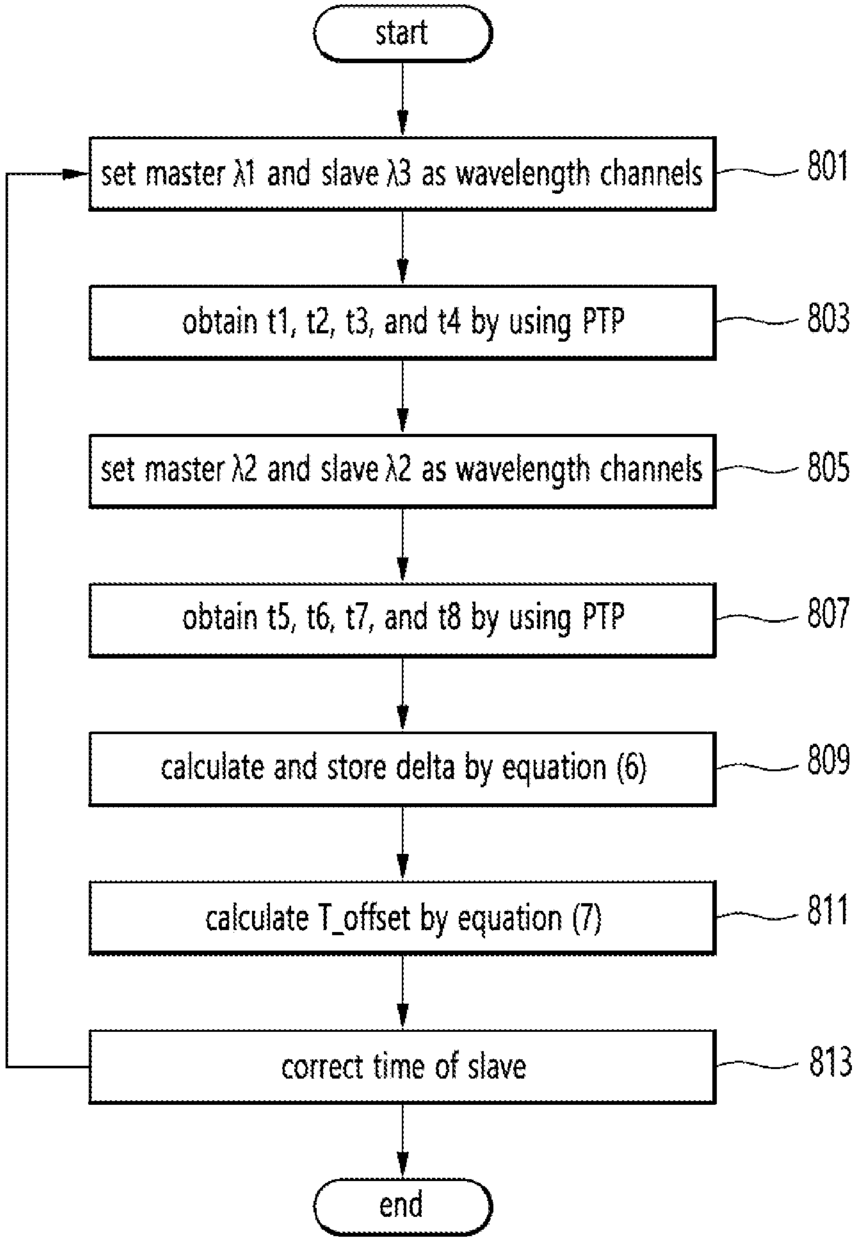
FIG. 8 illustrates a flowchart of an operation method for the Precision Time Protocol, according to an embodiment of the present disclosure.

FIG. 8 illustrates a flowchart of an operation method for the Precision Time Protocol, according to an embodiment of the present disclosure. The operation for the Precision Time Protocol shown in FIG. 8 may be performed by an apparatus 900 for two-way delay error compensation shown in FIG. 9.

Referring to FIG. 8, the apparatus for two-way delay error compensation may set wavelength channels, for example, a first wavelength (λ1) for a master and a third wavelength (λ3) for a slave in step 801.

In step 803, the apparatus for two-way delay error compensation may use the Precision Time Protocol (PTP) to identify a first time point (t1), a second time point (t2), a third time point (t3), and a fourth time point (t4). The first time point (t1), the second time point (t2), the third time point (t3), and the fourth time point (t4) may be the same times as t1, t2, t3, and t4 shown in FIG. 6.

In step 805, the apparatus for two-way delay error compensation may set a second wavelength (λ2) for the master and a second wavelength (λ2) for the slave.

In step 807, the apparatus for two-way delay error compensation may use the Precision Time Protocol (PTP) to identify a fifth time point (t5), a sixth time point (t6), a seventh time point (t7), and an eighth time point (t8). The fifth time point (t5), the sixth time point (t6), the seventh time point (t7), and the eighth time point (t8) may be the same times as t5, t6, t7, and t8 shown in FIG. 6.

In step 809, the apparatus for two-way delay error compensation may use Equation 8 of FIG. 6 to calculate and store Delta.

In step 811, the apparatus for two-way delay error compensation may use Equation 9 of FIG. 6 to calculate T_offset.

In step 813, the apparatus for two-way delay error compensation may correct the time of the slave.

After step 813, returning to step 801 takes place and steps 801 to 811 are performed several times, thereby obtaining the accuracy of correction of the time of the slave.

Figure 9:
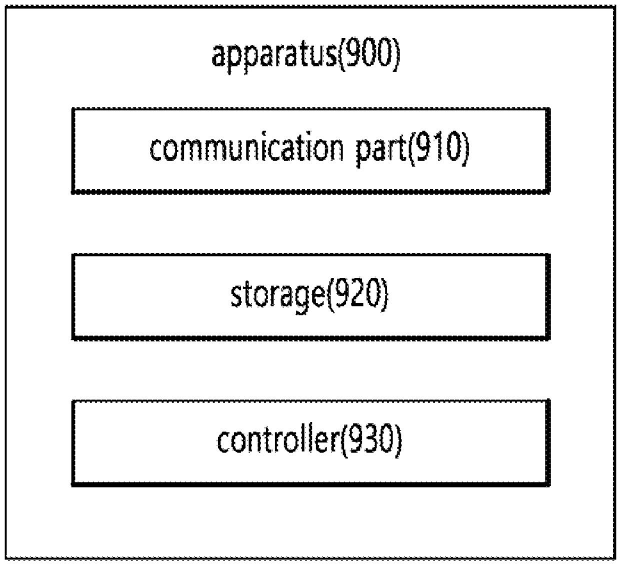
FIG. 9 illustrating a configuration diagram of an apparatus for two-way delay error compensation, according to various embodiments of the present disclosure.

FIG. 9 illustrating a configuration diagram of an apparatus for two-way delay error compensation, according to various embodiments of the present disclosure.

The configuration illustrated in FIG. 9 may be understood as the configuration of the apparatus 900 for two-way delay error compensation. The terms "~ part", "~ unit", and the like used below mean a unit for processing at least one function or operation, and may be implemented by hardware, software, or a combination of hardware and software.

Referring to FIG. 9, the apparatus for two-way delay error compensation may include a communication part 910, a storage 920, and a controller 930.

The communication part 910 may perform functions for transmitting and receiving signals through a wireless channel. In addition, the communication part 910 may include multiple transmission and reception paths. In terms of hardware, the communication part 910 may be a digital circuit and an analog circuit (for example, a radio frequency integrated circuit (RFIC)). Herein, the digital circuit and the analog circuit may be realized as one package.

The communication part 910 transmits and receives signals as described above. Accordingly, all or part of the communication part 910 may be referred to as a "transmitter", "receiver", or "transceiver". In addition, in the following description, transmission and reception performed through a wireless channel may be used to mean that the communication part 910 performs the above-described processing.

The storage 920 may store therein data, such as default programs, application programs, and setting information, for the operation of the apparatus for two-way delay error compensation. The storage part 920 may be a volatile memory, a non-volatile memory, or a combination of a volatile memory and a non-volatile memory. In addition, the storage 920 may provide stored data according to a request of the controller 930.

The controller 930 may control overall operations of the apparatus for two-way delay error compensation. For example, the controller 930 may transmit and receive signals through the communication part 910. In addition, the controller 930 may record data on the storage 920 and may read the data. The controller 930 may include at least one processor or microprocessor, or may be part of a processor. In addition, part of the communication part 910 and the controller 330 may be referred to as a communication processor (CP).

According to various embodiments, the controller 930 may perform control so that the apparatus for two-way delay error compensation performs the operations according to various embodiments shown in FIGS. 6 to 9.

According to the present disclosure, a two-way delay error occurring in physical connection between a PTP master and a PTP slave can be compensated for. Since the two-way delay error causes an error in a PTP slave clock, the method of compensating for the two-way delay error is applied to enable more accurate time correction and precise synchronization of the network.

In particular, the method is applied to fields that require a high level of clock synchronization such as mobile networks, thereby achieving a high level of network synchronization.

Methods according to the embodiments described in the claims of the present disclosure or in the specification may be implemented in the form of hardware, software, or a combination of hardware and software.

In the case of software implementation, a computer-readable storage medium in which at least one program (software module) is stored may be provided. The at least one program stored in the computer-readable storage medium is configured to be executable by at least one processor in an electronic device. The at least one program includes instructions for the electronic device to execute the methods according to the embodiments described in the claims of the present disclosure or the specification.

The program (software module or software) may be stored in non-volatile memory including random-access memory and flash memory, read-only memory (RCM), electrically erasable programmable read-only memory (EEPROM), a magnetic disc storage device, a compact disc-ROM (CD-ROM)), digital versatile discs (DVDs), optical storage devices of other types, or a magnetic cassette. Alternatively, the program may be stored in a memory composed of a combination of some or all of these memories. In addition, a plurality of such memories may be included.

In addition, the program may be stored in an attachable storage device that is accessible through a communication network, such as the Internet, Intranet, a local area network (LAN), a wide area network (WAN), or a storage area network (SAN), or a combination thereof. The storage device may be connected through an external port to an apparatus performing an embodiment of the present disclosure. In addition, a separate storage device on the communication network may be connected to the apparatus performing an embodiment of the present disclosure.

In the above-described detailed embodiments of the disclosure, an elements included in the disclosure is expressed in the singular or the plural according to a presented detailed embodiment. However, the singular form or plural form is selected suitable for the presented situation for convenience of description, and the various embodiments of the disclosure are not limited to a single element or multiple elements thereof. Further, either multiple elements expressed in the description may be configured into a single element or a single element in the description may be configured into multiple elements.

Although the specific embodiments have been described in the detailed description of the present disclosure, various modifications and changes may be made thereto without departing from the scope of the present disclosure. Therefore, the scope of the present disclosure should not be defined as being limited to the embodiments, but should be defined by the appended claims and equivalents thereof.

What is claimed is:

1. An operation method for two-way delay error compensation in a communication system, the operation method comprising:

setting a first wavelength (λ1) as a signal wavelength for a master and a third wavelength (λ3) as a signal wavelength for a slave in a first step;

identifying a first time point (t1), a second time point (t2), a third time point (t3), and a fourth time point (t4) by using Precision Time Protocol (PTP) in a second step;

setting a second wavelength (λ2) as a signal wavelength for the master and the second wavelength (λ2) for the slave in a third step;

identifying a fifth time point (t5), a sixth time point (t6), a seventh time point (t7), and an eighth time point (t8) by using the PTP in a fourth step;

identifying a delta value for a two-way delay error on the basis of the first time point to the eighth time point in a fifth step; and identifying a compensation value of the two-way delay error on the basis of the delta value for the two-way delay error in a sixth step, wherein the delta value for the two-way delay error is determined by the following Equation:

$$\text{Delta}=\{(t4-t3)+(t6-t5)-(t2-t1)-(t8-t7)\}/2. \quad \text{[Equation]}$$

2. The operation method of claim 1, wherein when the first wavelength (λ1) is set for the master and the third wavelength (λ3) is set for the slave, the first time point is a time point of transmission at the master when transmission from the master to the slave is performed, the second time point is a time point of reception at the slave when transmission from the master to the slave is performed, the third time point is a time point of transmission at the slave when transmission from the slave to the master is performed, and the fourth time point is a time point of reception at the master when transmission from the slave to the master is performed.

3. The operation method of claim 1, wherein when the second wavelength (λ2) is set for the master and the second wavelength (λ2) is set for the slave, the fifth time point is a time point of transmission at the master when transmission from the master to the slave is performed, the sixth time point is a time point of reception at the slave when transmission from the master to the slave is performed, the seventh time point is a time point of transmission at the slave when transmission from the slave to the master is performed, and the eighth time point is a time point of reception at the master when transmission from the slave to the master is performed.

4. The operation method of claim 1, wherein the compensation value (T_offset) of the two-way delay error is determined by the following Equation:

$$T\_\text{offset}=\{(t2-t1)-(t4-t3)\}/2+\text{Delta}/2. \quad \text{[Equation]}$$

5. The operation method of claim 1, wherein the first step to the sixth step are repeatedly performed to improve accuracy of the compensation value of the two-way delay error.

6. The operation method of claim 1, wherein when the first wavelength (λ1) is set for the master and the third wavelength (λ3) is set for the slave, a signal with the first wavelength is input from a first input port and output to a first output port in a first cyclic arrayed waveguide grating (AWG) related to the master.

7. The operation method of claim 1, wherein when the second wavelength (λ2) is set for the master and the second wavelength (λ2) is set for the slave, a signal with the second wavelength is input from a first input port and output to a second output port in a first cyclic arrayed waveguide grating (AWG) related to the master.

8. The operation method of claim 1, wherein when the second wavelength (λ2) is set for the master and the second wavelength (λ2) is set for the slave, a signal with the second wavelength is input from a second input port and output to a first output port in a second cyclic arrayed waveguide grating (AWG) related to the slave.

9. An apparatus for two-way delay error compensation in a communication system, the apparatus comprising:

a transceiver; and a controller operably connected to the transceiver, wherein the controller is configured to set a first wavelength (λ1) as a signal wavelength for a master and a third wavelength (λ3) as a signal wavelength for a slave, identify a first time point, a second time point, a third time point, and a fourth time point by using Precision Time Protocol (PTP), set a second wavelength (λ2) as a signal wavelength for the master and the second wavelength (λ2) for the slave, identify a fifth time point, a sixth time point, a seventh time point, and an eighth time point by using the PTP, identify a delta value for a two-way delay error on the basis of the first time point to the eighth time point, and identify a compensation value of the two-way delay error on the basis of the delta value for the two-way delay error, wherein the delta value for the two-way delay error is determined by the following Equation:

$$\text{Delta} = \{(t4 - t3) + (t6 - t5) - (t2 - t1) - (t8 - t7)\}/2. \quad \text{[Equation]}$$

10. The apparatus of claim 9, wherein when the first wavelength (λ1) is set for the master and the third wavelength (λ3) is set for the slave, the first time point is a time point of transmission at the master when transmission from the master to the slave is performed, the second time point is a time point of reception at the slave when transmission from the master to the slave is performed, the third time point is a time point of transmission at the slave when transmission from the slave to the master is performed, and the fourth time point is a time point of reception at the master when transmission from the slave to the master is performed.

11. The apparatus of claim 9, wherein when the second wavelength (λ2) is set for the master and the second wavelength (λ2) is set for the slave, the fifth time point is a time point of transmission at the master when transmission from the master to the slave is performed, the sixth time point is a time point of reception at the slave when transmission from the master to the slave is performed, the seventh time point is a time point of transmission at the slave when transmission from the slave to the master is performed, and the eighth time point is a time point of reception at the master when transmission from the slave to the master is performed.

12. The apparatus of claim 9, wherein the compensation value (T_offset) of the two-way delay error is determined by the following Equation:

$$\text{T\_offset} = \{(t2 - t1) - (t4 - t3)\}/2 + \text{Delta}/2. \quad \text{[Equation]}$$

13. The apparatus of claim 9, wherein the controller is configured to improve accuracy of the compensation value of the two-way delay error by repeatedly performing operation of the controller.

14. The apparatus of claim 9, wherein when the first wavelength (λ1) is set for the master and the third wavelength (λ3) is set for the slave, a signal with the first wavelength is input from a first input port and output to a first output port in a first cyclic arrayed waveguide grating (AWG) related to the master.

15. The apparatus of claim 9, wherein when the second wavelength (λ2) is set for the master and the second wavelength (λ2) is set for the slave, a signal with the second wavelength is input from a first input port and output to a second output port in a first cyclic arrayed waveguide grating (AWG) related to the master.

16. The apparatus of claim 9, wherein when the second wavelength (λ2) is set for the master and the second wavelength (λ2) is set for the slave, a signal with the second wavelength is input from a second input port and output to a first output port in a second cyclic arrayed waveguide grating (AWG) related to the slave.

17. An operation method of a master in a communication system, the operation method comprising:

setting a first wavelength (λ1) as a signal wavelength for the master;

identifying a first time point (t1) and a third time point (t3) by using Precision Time Protocol (PTP);

setting a second wavelength (λ2) as a signal wavelength for the master; and identifying a fifth time point (t5) and a seventh time point (t7) by using the Precision Time Protocol (PTP), wherein the first time point (t1), the third time point (t3), the fifth time point (t5), and the seventh time point (t7) are the basis for obtaining a delta value for a two-way delay error, wherein a second time point (t2), a fourth time point (t4), a sixth time point (t6) and an eighth time point (t8) are identified by a slave corresponding to the master, wherein the delta value for the two-way delay error is the basis for identifying a compensation value of the two-way delay error, and wherein the delta value for the two-way delay error is determined by the following Equation:

$$\text{Delta} = \{(t4 - t3) + (t6 - t5) - (t2 - t1) - (t8 - t7)\}/2. \quad \text{[Equation]}$$

* * * * *